(12) United States Patent
Alferiev et al.

(10) Patent No.: US 6,900,282 B2
(45) Date of Patent: May 31, 2005

(54) DERIVATIZED POLYURETHANE COMPOSITIONS WHICH EXHIBIT ENHANCED STABILITY IN BIOLOGICAL SYSTEMS AND METHODS OF MAKING THE SAME

(75) Inventors: Ivan Alferiev, Clementon, NJ (US); Ilia Fishbein, Philadelphia, PA (US); Robert J. Levy, Merion Station, PA (US)

(73) Assignee: The Children's Hospital of Philadelphia, Philadelphia, PA (US)

( * ) Notice: Subject to any disclaimer, the term of this patent is extended or adjusted under 35 U.S.C. 154(b) by 55 days.

(21) Appl. No.: 10/672,892

(22) Filed: Sep. 26, 2003

(65) Prior Publication Data

US 2004/0092698 A1 May 13, 2004

Related U.S. Application Data

(63) Continuation-in-part of application No. 09/985,316, filed on Nov. 2, 2001, now Pat. No. 6,689,861, which is a continuation of application No. 09/620,857, filed on Jan. 21, 2000, now Pat. No. 6,320,011.

(60) Provisional application No. 60/413,460, filed on Sep. 26, 2002, and provisional application No. 60/145,318, filed on Jul. 23, 1999.

(51) Int. Cl.$^7$ .............................................. C08G 18/30
(52) U.S. Cl. .................... 528/49; 525/452; 525/453; 525/454; 521/53
(58) Field of Search ............................ 528/49; 525/452, 525/453, 454; 521/53

(56) References Cited

U.S. PATENT DOCUMENTS

| | | | |
|---|---|---|---|
| 4,521,564 A | 6/1985 | Solomon et al. |
| 4,642,242 A | 2/1987 | Solomon et al. |
| 4,746,654 A | 5/1988 | Breliere et al. |
| 5,073,575 A | 12/1991 | Blanch et al. |
| 5,134,035 A | 7/1992 | Kumar et al. |
| 5,159,050 A | 10/1992 | Onwumere |
| 5,855,618 A | 1/1999 | Patnaik et al. |
| 6,320,011 B1 | 11/2001 | Levy et al. |

FOREIGN PATENT DOCUMENTS

WO    WO 95 20008 A    7/1995

OTHER PUBLICATIONS

Phaneuf, M.D. et al., "Covalent Linkage of Recombinant Hirudin to a Novel Ionic Poly (Carbonate) Urethane Polymer with Protein Binding Sites: Determination of Surface Antithrombin Activity", Artif. Organs 1998; 22:657–65.
Huang, L.L.H. et al., "Comparison of Epoxides on Grafting Collagen to Polyurethane and Their Effects on Cellular Growth", J. Biomed. Mater. Res. 1998; 39:630–6.
Lincoff et al., J.Am. Coll. Cardiol., 29, 808. 16 (1997).
Adibi et al., 1979, Polymer 20:483–487.
Mikroyannidis, 1984, J. Polymer Sci., Polymer Chem. Ed. 22:891–903.
Baumgartner et al., 1996, Asaio J. 42:M476–M479.
Grasel et al., 1987, J. Biomed. Mat. Res. 21:815–842.
Sivriev H et al., "Phosphorus–Containing Polyurethanes, Prepared by N–Modification", European Polymer Journal, 1990, pp. 73–76, vol. 26, No. 1, Pergamon Press Ltd., Oxford, GB.
Joshi, R. et al., "Calcification of Polyurethanes Implanted Subdermally in Rats is Enhanced by Calciphylaxis", Journal of Biomedical Materials Research, vol. 31, pp. 201–207, John Wiley & Sons, 1996.

*Primary Examiner*—Rachel Gorr
(74) *Attorney, Agent, or Firm*—Caesar, Rivise Bernstein, Cohen & Pokotilow, Ltd.

(57) ABSTRACT

A process for preparing the polyurethane derivative, the process including: providing a polyurethane having a urethane amino moiety, providing a multifunctional linker reagent of a formula: LG-$R_L$-(FG)$_n$, wherein n is an integer from 1 to 3, FG is a functional group, which is a halogen, a carboxyl group, a sulfonate ester, or an epoxy group, LG is a leaving group, which is a halogen, a carboxyl group, a sulfonate ester, or an epoxy group, and $R_L$ is an (n+1)-valent organic radical having at least one carbon atom; providing a protected thiol-containing reagent of a formula R—C(O)SH, or a salt thereof, wherein R is a $C_1$ to $C_6$ alkyl group; reacting the multifunctional linker reagent with the urethane amino moiety to form a polyurethane substituted with at least one substituent group of a formula: —$R_L$-(FG)$_n$; reacting the polyurethane with a protected thiol-containing reagent to form the polyurethane derivative.

27 Claims, 2 Drawing Sheets

DERIVATIZED POLYURETHANE COMPOSITIONS WHICH EXHIBIT ENHANCED STABILITY IN BIOLOGICAL SYSTEMS AND METHODS OF MAKING THE SAME

CROSS-REFERENCE TO RELATED APPLICATIONS

This application is a continuation-in-part of application Ser. No. 09/985,316, filed on Nov. 2, 2001, issued as U.S. Pat. No. 6,687,861, which is a continuation of application Ser. No. 09/620,857, filed on Jul. 21, 2001, now U.S. Pat. No. 6,320,011, issued on Nov. 20, 2001 which claimed benefit of Provisional Application No. 60/145,318 Jul. 23, 1999. This application claims the benefit of provisional Application No. 60/413,460, filed Sep. 26, 2002, which is incorporated herein in its entirety.

STATEMENT REGARDING FEDERALLY SPONSORED RESEARCH OR DEVELOPMENT

This research was supported in part by U.S. Government funds (National Heart, Lung and Blood Institute grant number NHLBI 59730), and the U.S. Government may therefore have certain rights in the invention.

BACKGROUND OF THE INVENTION

1. Field of Invention

This invention relates generally to the field of derivatized polyurethane polymers for in vitro and in vivo use.

2. Description of Related Art

Polyurethanes are polymers which can be made by condensing a diisocyanate with a diol, with two or more diols having different structures, or with both a diol and a diamine. For example, polyurethanes can be made as illustrated in FIGS. 1A and 1B. In FIG. 1A, a diisocyanate (OCN-A-CNO) is reacted with a diol (HO—X—OH) to form a polyurethane. It is understood that the proportion of end groups corresponding to the diisocyanate and the diol can be controlled by using an excess of the desired end group. For example, if the reaction in FIG. 1A is performed in the presence of an excess of the diisocyanate, then the resulting polyurethane will have isocyanate (—NCO) groups at each end.

Depending on the identity of the reaction products used to from them, polyurethanes can behave as elastomers or as rigid, hard thermosets. If the diisocyanate depicted in FIG. 1A is, for example, 4,4'-methylenebis(phenylisocyanate), then the region designated "HS" (i.e., "hard segment") in FIG. 1A will be relatively inflexible. If the diol depicted in FIG. 1A is, for example, polytetramethyleneoxide (i.e., HO—$(CH_2CH_2C_2CH_2O)_k$—H, wherein, e.g., k is about 10 to 30), then the region designated "SS" (i.e., "soft segment") will be relatively flexible. Methods of selecting polyurethane precursors which will yield a polyurethane having hard and soft segments which confer a desired property (e.g., flexibility, elastomericity, etc.) to the polyurethane are well known in the art.

As illustrated in FIG. 1B, methods of making segmented polyurethanes are also known in the art. In these methods, one or more types of polyurethane precursors (OCN—P—NCO) are reacted with a chain extending compound (HZ-Y-ZH) to yield a segmented polyurethane. By varying the proportions of different types of polyurethane precursors, their end groups, the identity of the chain extender, and the like, the composition of polyurethane segments in the segmented polymer can be controlled, as is known in the art.

Medical grade segmented polyurethanes are usually prepared as depicted in FIGS. 1A and 1B, by condensing a diisocyanate with a polymeric diol having a molecular weight of about 1,000 to 3,000 (e.g., polytetramethyleneoxide for polyether-urethanes or polycarbonatediols for polycarbonate-urethanes) in order to form a polyurethane precursor which is subsequently reacted with an approximately equivalent amount of a chain extender (e.g., a diol such as 1,4-butanediol or a diamine such as a mixture of diaminocyclohexane isomers). Polyurethanes can be used to form bulk polymers, coatings, fillings, and films. They are also readily machinable once set. The properties of polyurethanes have rendered them useful for medical and non-medical purposes, and they have been used for such purposes since at least the beginning of the twentieth century.

Medical uses of polyurethanes have, however, been heretofore limited by the tendency of polyurethane products which contact the blood stream or other biological fluids to calcify, induce thrombogenesis, and/or chemically and mechanically deteriorate. It is believed that polyurethane deterioration results, at least in part, from chemical breakdown of the block-copolymer structure of the polyurethane molecule.

Prior art methods of improving polyurethane stability have relied primarily upon two approaches. One approach involves incorporation into the polyurethane backbone of chain extending compound having groups to which substituents can be added. For example, with diisocyanates yields a polyurethane having reduced flammability and having esterified phosphonic groups attached to the polymer backbone, as described (Mikroyannidis, 1984, J. Polymer Sci., Polymer Chem. Ed. 22:891–903). These polymers have potential drawbacks when used in biomedical applications because of reduced reactivity of the di-hydroxy chain extending compounds, relative to standard chain-extenders such as 1,4-butanediol. Thus, the molecular weight and mechanical properties of polymers modified in this manner may preclude their medical use.

Chain extending compounds having quaternary ammonium and phosphorylcholine groups have been used to prepare polyurethanes for medical purposes (Baumgartner et al., 1996, ASAIO J. 42:M476-M479). However it does not appear to be possible to insert non-esterified phosphonic groups into polyurethanes using 1,2-diols having such groups, presumably because of the ability of phosphonic hydroxyl groups to react with isocyanates. At the same time, cleavage of phosphonic esters attached to the backbone of the polymer would result in simultaneous cleavage of urethane bonds.

The second approach to stabilizing polyurethanes is based on N-alkylation of urethane amine groups of the polyurethane chain. Contacting a polyurethane with an alkylating; agent in the presence of a strong base results in alkylation of the urethane amine groups of the chain to yield additionally-substituted amine groups. It is believed that the strong base serves to extract protons from the urethane nitrogen. It has been demonstrated that moderate grades of metallation with sodium hydride at temperatures not significantly exceeding 0° C. do not induce significant polymer degradation (Adibi et al., 1979, Polymer 20:483–487). The polyanions remain soluble in aprotic solvents like dimethyl formamide and N,N-dimethylacetamide (DMA).

The first application of this N-alkylation method to medical grade polyurethanes involved N-alkylation of sodium hydride-activated polymer using alkyl iodides to attach $C_2$ to $C_{18}$ alkyl chains to the polymer backbone (Grasel et al., 1987, J. Biomed. Mat. Res. 21:815–842). It is believed that addition of such alkyl chains to polyurethanes improves the blood compatibility of the polymers. Grasel et al. pre-treated the polyurethane with sodium hydride at a temperature of from −5° C. to 0° C., and the reaction of the activated polymer with alkyl iodides was performed at a temperature of about 50° C. At this temperature, degradation of the polymer chain can occur. Further developments of such methods allowed substitution of the polymer chain with 3-carboxypropyl and 3-sulfonopropyl groups by activating the polyurethane chain using sodium hydride and then alkylating the chain using sodium salts of 4-iodobutyric acid or 1,3-propane sulfone. Preparation of 3-carboxypropyl-modified polymers was complicated by the relatively low solubility of sodium 4-iodobutyrate in DMA. Another drawback to this method is that 4-iodobutyric acid, and alkyl iodides in general, are expensive and are not sufficiently stable in storage.

One type of medical application of polyurethanes involves a covalent immobilization of various proteins, cells, antibodies, and/or enzymes onto a polyurethane surface to make modified polyurethanes. Such modified polyurethanes would be useful in tissue engineering and artificial organ concepts, wound dressings, and gene delivery systems by making virtually any surgical implant and interventional device potentially therapeutic.

Surface coatings and treatments, however, are problematic in that they can invoke acute or chronic inflammatory responses to the coatings themselves. The use of synthetic polymers and biopolymer coatings for delivery purposes can, in some instances, result in an undesirable hyperproliferation response among cells that contact the polymeric material. Polyurethane, poly(dimethyl siloxane) and polyethylene terephthalate coated stents are known to cause inflammation and thrombus formation. Low molecular weight poly-L-lactic acid coatings also cause an inflammatory response. Lincoff et al., J. Am. Coll. Cardiol., 29, 808.16 (1997).

Prior art polyurethanes that are suitably modified for the covalent immobilization of various proteins are rather limited in number and utility. For example, polyurethanes containing pendant carboxy groups were synthesized in order to covalently attach recombinant hirudin (Phaneuff, M. D. et al. "Covalent Linkage of Recombinant Hirudin to a Novel ionic Poly(carbonate)urethane Polymer With Protein Binding Sites: Determination of Surface Antithrombin Activity," Artif. Organs 1998; 22:657–65). Alternatively, polyurethanes with pendant epoxy groups have been used for the covalent immobilization of collagen (Huang L. L. H. et al. "Comparison of Epoxides on Grafting Collagen to Polyurethane and Their Effects on Cellular Growth," J. Biomed. Mater. Res. 1998; 39:630–6).

One example of derivatizing polyurethanes with reactive moieties so such polyurethanes can react with molecules of interest, for example, bioactive molecules is polyurethane derivatized to contain pending geminal bisphosphonate groups disclosed in U.S. Pat. No. 6,320,011 to Levy et al. Derivatized polyurethane can then react with proteins, cells, antibodies, and/or enzymes.

Polyurethanes that are similarly modified with pendant thiol groups would be highly desirable and of more general utility than prior art polyurethanes. For example, polyurethanes having pendant thiol functionalities would be widely applicable for the conjugation of biologically active molecules such as proteins and would be very reactive in physiological environments. A significant challenge in preparing macromolecules that contain multiple thiol groups, however, lies in the unavoidable oxidative cross-linking of such macromolecules and subsequent reduction or loss of certain characteristics such as flexibility.

Therefore, despite there is a need for polyurethanes containing pendant thiol groups, which can be employed in a vast array of thiol-mediated biochemical interactions. Additionally, a need exists for methods of making such polyurethanes, which methods circumvent oxidative cross-linking of polymer molecules.

All references cited herein are incorporated herein by reference in their entireties.

BRIEF SUMMARY OF THE INVENTION

Accordingly, the invention provides a process for preparing the polyurethane derivative, the process comprising:

providing a polyurethane comprising a urethane amino moiety;

providing a multifunctional linker reagent of a formula:

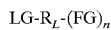
LG-$R_L$-(FG)$_n$ wherein n is an integer from 1 to 3, FG is a functional group selected from the group consisting of a halogen, a carboxyl group, a sulfonate ester, and an epoxy group, LG is a leaving group selected from the group consisting of a halogen, a carboxyl group, a sulfonate ester, and an epoxy group, and $R_L$ is an (n+1)-valent organic radical comprising at least one carbon atom;

providing a protected thiol-containing reagent of a formula R—C(O)SH, or a salt thereof, wherein R is a $C_1$ to $C_6$ alkyl group;

reacting the multifunctional linker reagent with the urethane amino moiety to form a polyurethane substituted with at least one substituent group of a formula

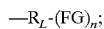
—$R_L$-(FG)$_n$;

reacting the polyurethane substituted with at least one substituent group with a protected thiol-containing reagent to form the polyurethane comprising the thiol substituent pendant from a urethane nitrogen.

In certain embodiments, $R_L$ is a bivalent organic radical selected from the group consisting of $C_1$ to $C_{18}$ alkylene, $C_1$ to $C_{18}$ alkyleneamino, $C_1$ to $C_{18}$ alkyleneoxy, $C_1$ to $C_{18}$ haloalkylene, $C_2$ to $C_{18}$ alkenylene, $C_6$ to $C_{18}$ arylene, a modified $C_2$ to $C_{18}$ alkenylene having at least one carbon substituted by a halogen group, $C_2$ to $C_{18}$ alkenylene having one or more O, S, or N atoms incorporated into an alkenylene chain, a bivalent heterocyclic radical, and mixtures thereof.

In certain embodiments, $R_L$ is a member selected from the group consisting of $C_1$ to $C_6$ alkylene.

In certain embodiments, LG is a bromo group.

Preferably, $R_1$, is butylene, FG is a bromo group, LG is a bromo group and n is 1.

In certain embodiments, the sulfonate ester is a member selected from the group consisting of mesylate, triflate, and tosylate.

In certain embodiments, the sulfonate ester is a member selected from the group consisting of a ω-bromoalkyl mesylate, a ω-bromoalkyl triflate, and a ω-bromoalkyl tosylate.

In certain embodiments, the multifunctional linker reagent is a member selected from the group consisting of a dibromoalkyl compound, a bromo-carboxyalkyl compound, and a bromo-epoxyalkyl compound.

In certain embodiments, the dibromoalkyl compound is a 1,ω-dibromoalkyl compound or substituted 1,ωdibromoalkyl compound. Preferably, the dibromoalkyl compound is a $C_2$–$C_6$ 1,ω-dibromoalkyl compound, most preferably, the dibromoalkyl compound is 1,6-dibromohexane or 1,4-dibromobutane.

In certain embodiments, the bromo-carboxyalkyl compound is a ω-bromocarboxylic acid or a substituted ω-bromocarboxylic acid.

In certain embodiments, the bromo-epoxyalkyl compound is epibromohydrin.

In certain embodiments, the process is conducted in a presence of an aprotic solvent. In certain embodiments, the aprotic solvent is a member selected from the group consisting of N,N-dimethylacetamide, N,N-dimethyl formamide, 1-methyl-2-pyrrolidinone, tetrahydrofuran, dioxane, and dimethyl sulfoxide.

In certain embodiments, the process is conducted in a presence of a base soluble in the aprotic solvent.

In certain embodiments, the base is a member selected from the group consisting of sodium hydride, lithium diisopropylamide, and sodium.

In certain embodiments, the base is potassium tert-butoxide, dimsyl sodium, lithium hydride, sodium amide, lithium N,N-dialkylamide, or lithium N,N-dicyclohexylamide. Preferably, the base is lithium tert-butoxide.

In certain embodiments, the multifunctional linker reagent is 1,6-dibromohexane, and the base is lithium diisopropylamide.

In certain embodiments, the multifunctional linker reagent is 1,4-dibromobutane.

In certain embodiments, the protected thiol-containing reagent is thiolacetic acid.

In certain embodiments, the protected thiol-containing reagent is tetrabutylammonium thioacetate.

Also provided is a process of preparing a polyurethane derivative, the process comprising:
providing a polyurethane;
providing a multi-functional linker, wherein the multi-functional linker has a leaving group and a functional group;
providing a protected thiol-containing reagent comprising a thiolic moiety;
contacting the polyurethane with the multi-functional linker in the presence of an aprotic solvent and a base such that the leaving group reacts with the polyurethane to form a polyurethane substituted with at least one substituent group; and
contacting the polyurethane substituted with at least one substituent group with a protected thiol-containing reagent such that the functional group reacts with the thiolic moiety to form the polyurethane derivative having a reacted thiol substituent pendant therefrom.

In certain embodiments, the leaving group is a bromo group and the functional group is a member selected from the group consisting of halogen, a sulfonate ester, a carboxyl group, and an epoxy group.

In certain embodiments, the multi-functional linker is represented by the formula:

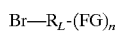

wherein n is an integer from 1 to 3, FG is a functional group selected from the group consisting of a halogen, a carboxyl group, a sulfonate ester, and an epoxy group, and $R_L$ is an (n+1)-valent organic radical comprising at least one carbon atom.

BRIEF DESCRIPTION OF SEVERAL VIEWS OF THE DRAWINGS

The invention will be described in conjunction with the following drawings in which like reference numerals designate like elements and wherein.

DETAILED DESCRIPTION OF THE INVENTION

Figure 1A:
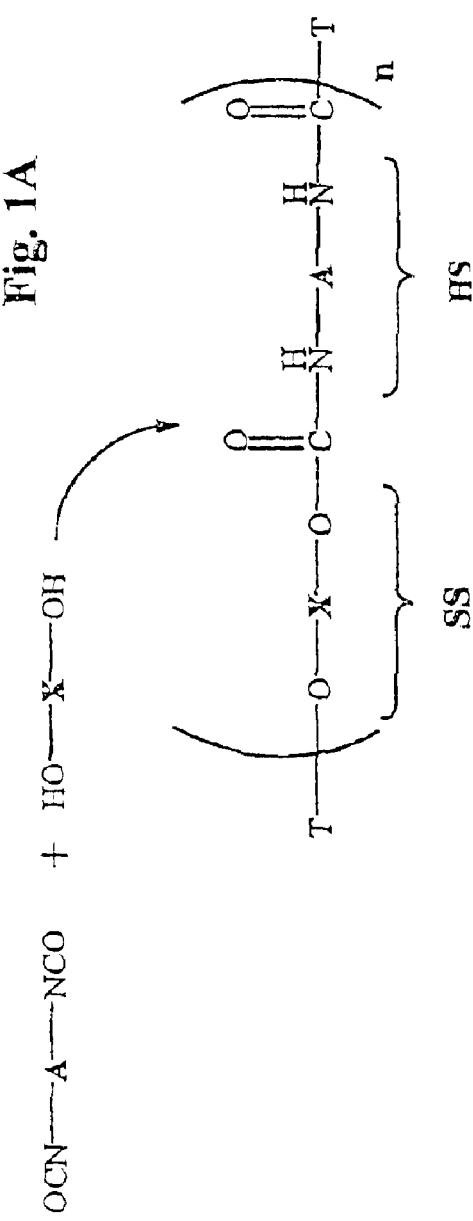
In FIG. 1A, "T" refers to a terminal group (e.g., either —H or —CO—NH-A-NCO).
Figure 1B:
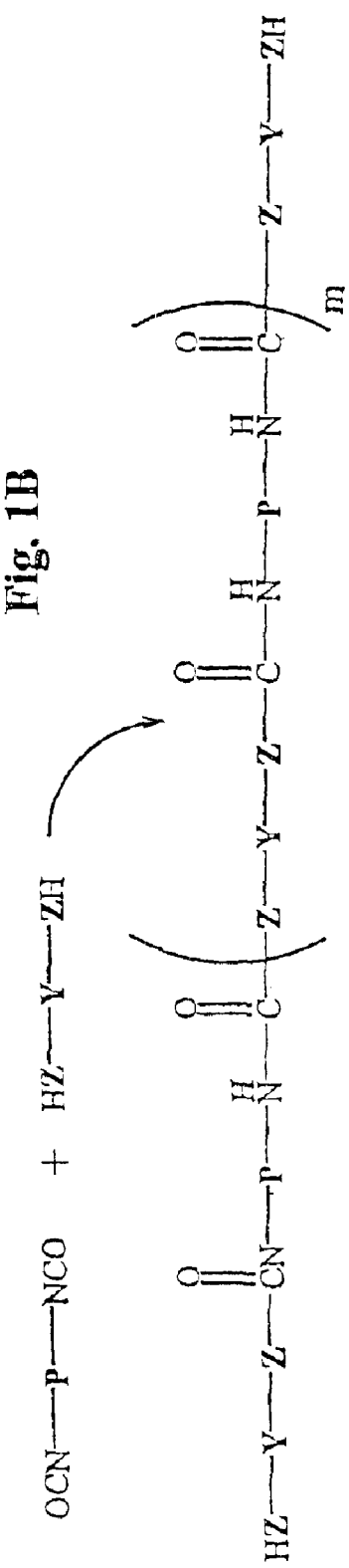
FIG. 1 depicts prior art reaction schemes for generating a polyurethane (FIG. 1A) and a segmented polyurethane (FIG. 1B).

The present invention is based upon the discovery of polyurethanes that have a thiol substituents pendant from a urethane nitrogen and methods of making such polyurethanes. An advantage of this invention is that the methods are efficacious under relatively mild conditions, which decrease the potential for polyurethane decomposition. Yet another advantage is that the polyurethanes are sufficiently robust to withstand conditions that are typical for high temperature processing of polyurethanes, and thus avoid the oxidative thiol cross-coupling that attends other macromolecules containing multiple thiol groups.

Accordingly, the present polyurethanes can be molded or extruded for use in many applications, including therapeutic implants and interventional devices. In this context, the present invention provides the use of sulfhydryl chemistry for immobilizing proteins, cells, and other complex constructs, such as gene delivery systems, on the surface of medical grade polyurethanes.

Polyurethanes

In accordance with the teachings of this invention, the polyurethane has at least one pendant thiol substituent which is either thiol or protected thiol group or a mixture of both.

The term "polyurethane," as used herein, is a polymer that comprises repeating units having a urethane group in the polymer backbone. Such polymers include, for example, polyurethane homopolymers, block co-polymers comprising at least one polyurethane block, and polymer blends comprising such homopolymers and block co-polymers. Illustrative polyurethanes include but are not limited to F2000 PEU, which is a medical grade polyether-urethane prepared from 4,4-methylenebis(phenylisocyanate), polytetramethyleneoxide (MW ca. 1,000 g/mol), and 1,4-butanediol as a chain extender (Sulzer Carbomedics, Inc.; Austin, Tex.); BIO-SPAN™, which is a medical grade polyurethane-urea and BIONATE™ 80A, which is a medical grade polycarbonate-urethane (both from Polymer Technology Group Medical, LLC; Berkeley, Calif.); and TECOTHANE™ TT-1074A, which is a medical grade polyether-urethane (Thermedics, Inc.; Woburn, Mass.).

A chemical substituent is "pendant" from a backbone of a polymer if it is bound to an atom of a monomeric unit of the polymer. In this context, the substituent can be pending from a carbon atom of a backbone, a carbon atom connected to a carbon atom of the backbone by a chain extender, or a urethane nitrogen of the backbone of the polyurethane.

In one embodiment of the invention, the thiol or protected thiol substituent is pendant from a urethane nitrogen of the backbone of the polyurethane. As used herein, a "urethane" refers to a chemical subunit of a polyurethane backbone and that has the following general structure:

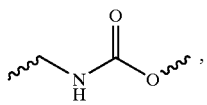

wherein the wavy lines signify bonds to the rest of the polyurethane backbone.

As mentioned above, the thiol or protected thiol groups have a general formula —$R_L$—(S—$R^1$)$_n$, wherein $R_L$ is a multivalent organic radical. The chemical identity of $R_l$ is not critical, except that it must comprise at least one carbon atom. Since "n" can vary between 1 and 3, $R_L$ may carry 1, 2, or 3 S—$R^1$ moieties, respectively, thus providing polyurethanes with mixed thiol or protected thiol substituents. Preferably, "n" is 1, where $R_L$ serves as a bivalent organic radical.

Bivalent organic radicals suitable as $R_L$ include, for example, straight or branched $C_1$ to $C_{18}$ alkylene groups. Illustrative alkylene groups are methylene, ethylene, propylene, butylene, pentylene, and hexylene. Preferably, $R_L$ is butylene. The alkylene groups may be substituted by one or more halo substituents, which include —F, —Cl, —Br, and —I.

Other bivalent organic radicals include $C_1$ to $C_{18}$ alkyleneamino and $C_1$ to $C_{18}$ alkyleneoxy groups. Alkyleneamino groups are alkylene groups that are interrupted by one or more amino fragments. Similarly, $C_1$ to $C_{18}$ alkyleneoxy groups are alkylene groups that are interrupted by one or more oxy (i.e., —O—) moieties.

Still other bivalent organic radicals are cyclic moieties such as arylene groups and bivalent heterocyclic radicals. An arylene group is a $C_6$ to $C_{12}$ bivalent aromatic hydrocarbon. Exemplary arylene groups are phenylene and napthylenylene. Bivalent heterocyclic radicals are preferably 5- to 6-member heterocycles containing at least one heteroatom selected from N, S, and O, such that two valences on the heterocycle are available for forming bonds. Exemplary heterocycles include thiazoline, thiazolidone, imidazole, imidazoline, thiazole, triazoles, tetrazole, thiadiazole, imidazole, pyridine, and morpholine.

For polyurethanes that comprise protected thiol substituents, $R^1$ in the formula above can be an acyl group of the formula C(O)$R^3$. $R^3$ is a straight or branched $C_1$ to $C_6$ alkyl group. The most preferred $R^3$ is methyl. Alternatively, $R^1$ is of the formula —$SR^4$, wherein the polyurethane comprises pendant dithio groups. In this instance, $R^4$ is a heterocyclic group as defined above or an electron deficient aromatic group. Although any heterocycle would suffice, the preferred heterocycle is pyridine. The electron deficient aromatic group is defined as above for the arylene group, but which is also substituted with one or more electron-withdrawing substituents. Suitable substituents in this context include carboxyl, nitro, fluoro, chloro, bromo, formyl, esters, and sulfonate esters. The preferred electron deficient aromatic group is 3-carboxy-4-nitrophenyl.

The polyurethanes of this invention are further characterized in that about 0.5 to about 50% of the urethane nitrogen atoms of the backbone of the polyurethane carry a pendant thiol or protected thiol substituent. Preferably, about 1 to about 20%, and most preferably about 5 to about 10% of the nitrogen atoms carry such substituents.

Alternatively characterized, the polyurethane of the invention comprises at least about 10 micromoles of the thiol substituent per gram of the polyurethane.

In certain embodiments, the polyurethane of the invention comprise about 10 to about 400, preferably about 20 to about 200, micromoles of the thiol or protected thiol group per gram of polyurethane. As mentioned above, the polyurethane of this invention can comprise one type of such substituents, or it can comprise more than one type of substituents.

In yet another embodiment, the polyurethane of the invention comprises a plurality of thiol substituents pendant from at least one urethane nitrogen of the polyurethane.

The polyurethanes of the invention are useful in the manufacture of a wide range of devices, including medical devices such as therapeutic implants and interventional devices. Implantable devices which can be made using the polyurethane of the invention include, but are not limited to, degradable and non-degradable sutures, orthopedic protheses such as supporting rod implants, joint protheses, pins for stabilizing fractures, bone cements and ceramics, tendon reconstruction implants, prosthetic implants, cardiovascular implants such as heart valve prostheses, pacemaker components, defibrillator components, angioplasty devices, intravascular stents, acute and in-dwelling catheters, ductus arteriosus closure devices, implants deliverable by cardiac catheters such as atrial and ventricular septal defect closure devices, urologic implants such as urinary catheters and stents, neurosurgical implants such as neurosurgical shunts, ophthalmologic implants such as lens prosthesis, thin ophthalmic sutures, and corneal implants, dental prostheses, and internal and external wound dressings such as bandages and hernia repair meshes.

Process for Preparing Polyurethanes

The processes of this invention are implemented under mild conditions, such as low temperature, which allow the preparation of polyurethanes carrying pendant thiol groups. The processes thus circumvent any risk of oxidative cross-coupling between multiple thiol groups that would attend higher temperature synthetic routes.

The process of this invention provides the polyurethane having at least one pendant thiol protected group. The process comprises first reacting the urethane amino moiety of polyurethane with a multifunctional linker reagent of the general formula:

LG-$R_L$-(FG)$_n$ wherein $R_L$ and n are as described above and LG is a leaving group selected from the group consisting of a halogen, a carboxyl group, a sulfonate ester, and an epoxy group. Thus, the linker can be a bi-, tri-, tetra-functional linker. Preferred sulfonate esters include but are not limited to mesylate (i.e., $CH_3SO_2O$—), triflate (i.e., $CF_3SO_2O$—), and tosylate (i.e., $CH_3C_6H_4SO_2O$). Preferred halogen group is a bromo group.

Reaction between polyurethane and the multifunctional linker reagent is also described in details in copending U.S. patent application entitled "NOVEL THIOL ACTIVATION OF POLYURETHANES AND METHODS OF MAKING THE SAME," by Alferiev, Fishbein, and Levy, filed on even date herewith and incorporated herein in its entirety.

The inventors have discovered that the bromine substituent of the multifunctional linker reagent is surprisingly reactive with polyanionic polyurethane, which is generated by maintaining polyurethane in the presence of a strong base. The reactivity is maintained at a temperature of less than about 30° C., less than about 20° C., less than about 10° C., less than about 0° C., and even less than about −5° C.

Each FG is a functional group that is independently selected from halo substituents such as chloro, bromo, and iodo; a carboxyl group; a sulfonate ester; and an epoxy group. The functional group is therefore a leaving group or is a group with which the protected thiol containing reagent described below forms a bond. Halo and sulfonate ester groups are exemplary leaving groups. Preferred sulfonate esters include but are not limited to mesylate (i.e., $CH_3SO_2O$—), triflate (i.e., $CF_3SO_2O$—), and tosylate (i.e., $CH_3C_6H_4SO_2O$—). When FG is a halo or sulfonate ester group, any carbon atom to which it can be attached is preferably an aliphatic carbon. When FG is an epoxy ring, however, any carbon to which it is attached can be aliphatic, unsaturated, or aromatic.

The multifunctional linker reagent can have various combinations of LG and FG groups and is not limited to the examples above. LG and one, two or three FG groups can be different or the same chemical group.

Examples of synthesis of ω-carboxylated and epoxyalkylated polyurethanes are fully described in U.S. Pat. No. 6,320,011 to Levy at al. (FIGS. 3 and 5).

In a preferred embodiment of the method of the invention, the multi-functional linker reagent is a dibromoalkyl compound, a bromo-carboxyalkyl compound, or a bromo-epoxyalkyl compound. Particularly preferred dibromoalkyl compounds include 1,ω-dibromoalkyl compounds such as 1,6-dibromohexane, 1,4-dibromobutane, and substituted 1,ω-dibromoalkyl compounds. Particularly preferred bromo-carboxyalkyl compounds include ω-bromocarboxylic acids such as ω-bromohexanoic acid, ω-bromoundecanoic acid, and substituted ω-bromocarboxylic acids. Particularly preferred bromo-epoxyalkyl compounds include bromo-oxiranealkyl compounds such as epibromohydrin.

The inventors have discovered that dibromoalkyl compounds having relatively short alkyl chain lengths (e.g., dibromo-$C_2$, -$C_3$, -$C_4$, -$C_5$, and -$C_6$ compounds), and presumably bromo-carboxyalkyl and bromo-epoxyalkyl compounds having similarly short alkyl chain lengths, exhibit greater reactivity with urethane anionic moieties. Owing to this enhanced reactivity, a less strong base (e.g., lithium tert-butoxide) can be used, with the advantage that base-mediated degradation of the polyurethane can be reduced.

In another preferred embodiment, at least one functional group is a sulfonate ester. Thus, in this embodiment, the multi-functional linker reagent can, for example, be ω-bromoalkyl sulfonate esters such as ω-bromoalkyl mesylates (i.e., $CH_3SO_2O(CH_2)_qBr$, wherein q is an integer equal to or greater than 1), ω-bromoalkyl triflates (i.e., $CF_3SO_2O(CH_2)_qBr$), and ω-bromoalkyl tosylates.

The reaction described above is preferably performed in an aprotic solvent. The aprotic solvent can be substantially any aprotic solvent. An illustrative aprotic solvent is N,N-dimethylacetamide (DMAc), but a wide variety of other aprotic solvents can be used instead, including, for example, N,N-dimethyl formamide, 1-methyl-2-pyrrolidinone, tetrahydrofuran, dioxane, and dimethyl sulfoxide (DMSO).

Additionally, the reaction is best performed in the presence of a strong base, which renders the polyurethane amino nitrogen atoms into their more nucleophilic anionic forms. The strong base can be substantially any strong base that is soluble in the aprotic solvent used. Exemplary strong bases include sodium hydride, lithium diisopropylamide, sodium or potassium tert-butoxide, dimsyl sodium, lithium hydride, sodium amide, lithium N,N-dicyclohexylamide, and other lithium N,N-dialkylamides.

It is important to consider the effect that a counter-ion of the base may have upon the multi-functional linker, the derivatized polyurethane, or both. For example, the multi-functional linker should not be precipitated from solution, since this would complicate reaction of the linker with the polyurethane. Similarly, if it is desired that the derivatized polymer should remain in solution, a base should be chosen which does not have a counter-ion which would precipitate the derivatized polymer. For example, if the multi-functional linker comprises one or more carboxyl groups and several methylene groups, strong bases which have sodium counter-ions should be avoided. The same bases having lithium counter-ions, however, are preferable.

As noted above, when a multi-functional linker having a relatively high reactivity with polyurethane anionic moieties is used, the strength of the base can be lower than when a multi-functional linker having a lower reactivity is used. Thus, for example, strong bases such as lithium diisopropylamide (LDA) can be used when the linker is, for example, 1,6-dibromohexane, whereas relatively weaker bases such as lithium tert-butoxide are preferred when the linker is more reactive (e.g., 1,4-dibromobutane). Alternatively, lithium tert-butoxide can be used in combination with all multifunctional linker reagents. In this scenario, for example, the yield of bromoalkylation (i.e., the molar ratio of bromoalkylated urethane segments to base) exceeds 90% when lithium tert-butoxide is employed as compared to yields of 50–60% for LDA.

Continuing, the process further comprises reacting the polyurethane that is substituted with at least one —$R_L(FG)_n$ substituent with a protected thiol-containing reagent of the formula R—C(O)—SH or a salt thereof. Each R—C(O)—SH thus displaces one FG. Suitable reagents are those in which R is a $C_1$ to $C_6$ alkyl group. A particularly preferred reagent is thiolacetic acetic acid (i.e., $CH_3C(O)SH$).

The substitution of FG is preferably accomplished by using salts of R—C(O)—SH (i.e., [R—C(O)—S]X, where X is a cation), which are the most reactive toward —$R_L$ $(FG)_n$ substituents. In principle, any salt may be used, such as those of sodium, potassium, or zinc, but in any case should be chosen such that the concentration of R—C(O)—$S^-$ in reaction mixtures is maintained at least at 0.1M, preferably 0.2 M. At these concentrations, complete substitution of functional groups FG can be realized. Thus, the most preferred salts are those containing cations that are relatively soluble in the solvent. For example, where the solvent is an aprotic solvent, as described above, the cation can be a tetralkyl ammonium ion such as $Bu_4N^+$ or $Me_4N^+$ and the like. Alternatively, the cation can be a protonated strong organic base, where the base is, for example, a strong tertiary amine such azabicyclooctane, guanidine or an N-alkyl derivative of guanidine, or tetramethyl-1,8-diaminonaphthalene. The most preferred salt is tetrabutylammonium thioacetate (i.e., $(Bu_4N)S(O)CCH_3$).

As mentioned above, the concentration of R—C(O)—$S^-$ should be maintained at least at 0.1 M. In one embodiment, this can be accomplished by adding the requisite amount of pre-formed R—C(O)—SX to a solution of the polyurethane having —$R_L(FG)_n$ substituents. Alternatively, the reaction between the polyurethane having —$R_L(FG)_n$ substituents and the protected thiol reagent is performed in the presence of a proton scavenger that is not susceptible to alkylation. One class of suitable scavengers includes tetralkalkyammonium salts of a weak acid. For example, the tetralkalkyammonium salt of a weak acid can be tetrabutylammonium borate, carbonate, hydrocarbonate, or hydroxide. Another class of suitable scavengers is neutral organic bases, such as sterically-hindered tertiary amines, N-alkylguanidines, and tetramethyl-1,8-diaminonaphthalene. Preferably, the substitution of FG is performed in the presence of R—C(O)—$S^-$, although such substitution can be achieved with mixtures of R—C(O)—SH and R—C(O)—$S^-$ (e.g., 1:1 molar ratio).

The polyurethane prepared by the process described above exhibits remarkable thermal stability. Thus, the polyurethane can be subjected to the high temperatures typically encountered in routine processing methods such as molding and extrusion that are used to form, for example, medical devices as described above. Because the polyurethane has pendant protected thiol groups, such processing can be performed without the risk of degradation that would otherwise result from oxidative cross-coupling of pendant thiol groups. Once the polyurethane is processed into a desired form, the thiol groups can be deprotected.

Accordingly, the present invention also provides a process of preparing a polyurethane having pendant thiol groups. The process comprises the two steps described above to furnish a polyurethane having pendant protected thiol groups. The polyurethane is then treated with a reagent that can deprotect the protected thiol groups, e.g., remove the R—C(O)— fragment via acid- or base-catalyzed hydrolysis. Suitable reagents in this context include ammonia; primary aliphatic amines; aqueous solutions of alkali metal hydroxides, carbonates, or trisubstituted phosphates; hydroxylamine; and hydrazine. A preferred deprotecting reagent is hydroxylamine (e.g., $NH_2OH$).

Figure 2:
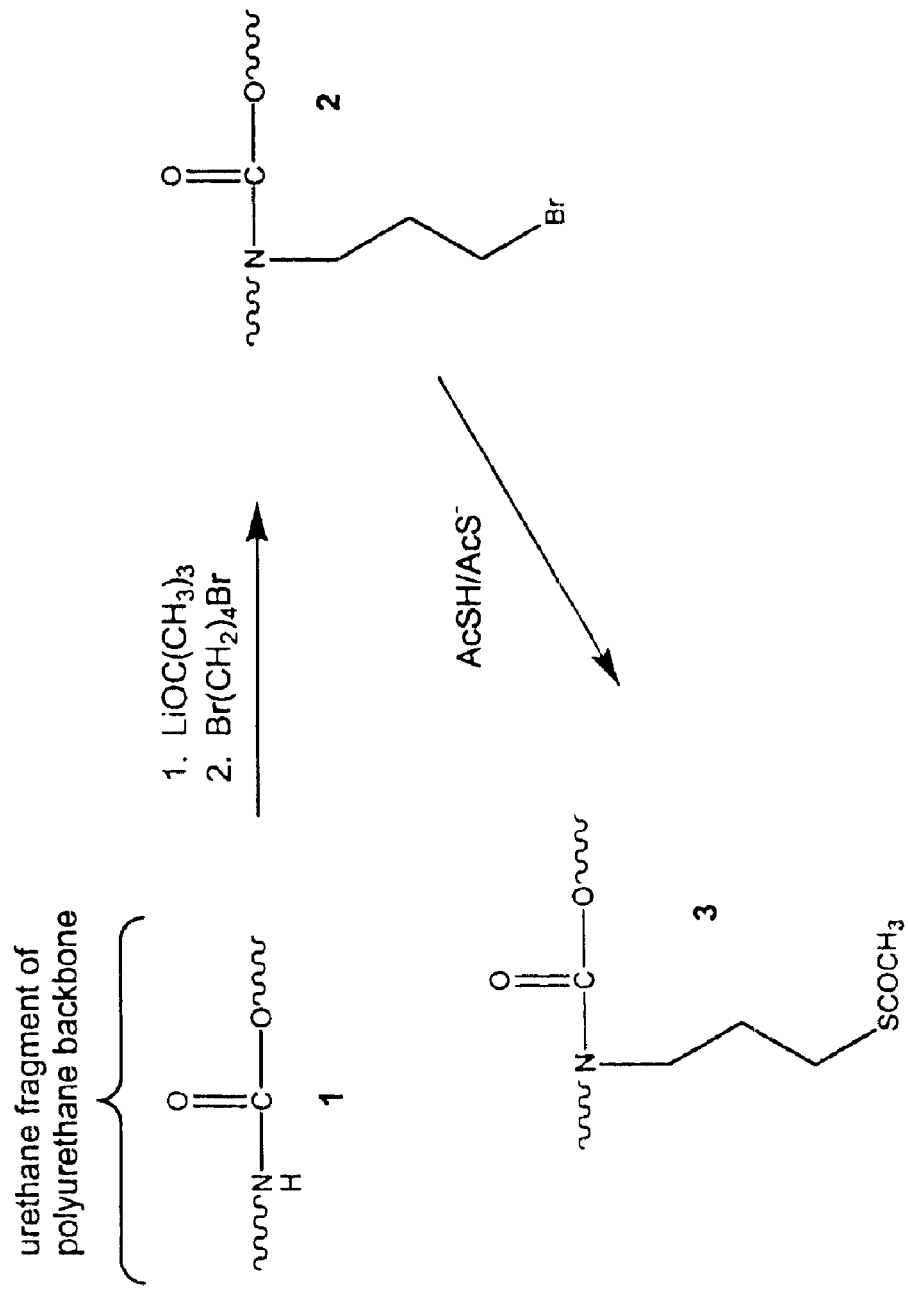
FIG. 2 depicts a synthesis of a polyurethane having a pendant protected thiol group. A urethane amino nitrogen in a polyurethane schematically represented herein as 1 is bromoalkylated to obtain a bromobutyl derivative 2, in which the bromo substituent is subsequently substituted by thiolacetate to obtain polyurethane 3 having a pendant protected thiol group.

In the experiments described below, the following materials, procedures and apparatuses were used:

A Bruker Advance DMX 400 spectrometer was used for recording the NMR spectra reported herein. Medical grade polyether-urethane Tecothane TT1074A was obtained as pellets from Thermedics Inc. (Woburn, Mass.) and used without any purification. This polymer, represented generally as 1 in FIG. 2, is based on 4,4'-methylenebis(phenyl isocyanate) (MDI), polytetramethylene ether glycol (PTMEG), and 1,4-butanediol as a chain extender.

EXAMPLES

The invention will be illustrated in more detail with reference to the following Examples, but it should be understood that the present invention is not deemed to be limited thereto.

Example 1

Preparing Polyurethane with Pendant 4-Bromobutyl Substituents

This example demonstrates a method of derivatizing polyurethane by using a multifunctional linking reagent.

The polyurethane as described above (15.8 g, containing ca. 38 mmol of urethane NH groups) was soaked in toluene (150 ml) for 60 hours. After removal of the excess solvent, the swollen polymer was dried in vacuo at 40° C. and dissolved in dry N,N-dimethylacetamide (DMAc) (300 ml) under a flow of dry argon.

Freshly distilled 1,4-dibromobutane (15 ml, 126 mmol) was added, the solution was cooled to −6° C., and a 1.0 M solution of lithium tert-butoxide in hexanes (Sigma-Aldrich, 7.6 ml, 7.6 mmol) diluted with dry DMAc (20 ml) was added over a 10-minute period with vigorous stirring at −5 to −6° C. The resultant mixture was stirred at −1° to 1° C. for 1 hour with continued argon protection and then acidified with acetic acid (6.5 ml).

The reaction solution was poured into a large volume (1200 ml) of cold (−55° C.) methanol, the resulting coagulate of polymer was separated, thoroughly washed with methanol followed by 2-propanol, and dried in vacuo (0.5 mm Hg) at room temperature.

The crude polymer was redissolved in DMF (275 ml), the solution was filtered, and the polymer was precipitated with cold methanol, washed with large volumes of methanol and water, stirred for 16 hours with a large amount of water at 4° C. and dried in vacuo (0.04 mm Hg) at room temperature to yield 15.64 g of the polyurethane derivative represented generally as 2 in FIG. 2. $^1$H NMR spectral analysis of 2 showed that the concentration of bromobutyl groups was 0.45 mmol per gram of 2 (FIG. 2).

Example 2

Preparation of a Polyurethane having Pendant Acetylthiobutyl Substituents

This example demonstrates the preparation and thermal stability of a polyurethane having pendant protected thiol groups.

Polyurethane 2 (15.5 g, containing ca. 7.1 mmol of pendant bromobutyl groups) as prepared in Example 1 was dissolved in dry DMAc (220 ml) under a flow of argon, and the solution was cooled to −8° C. Freshly vacuum-distilled (at 115 mm Hg) thiolacetic acid (5.72 ml, 80 mmol), together with a freshly prepared 0.25M DMAc-solution of tetrabutylammonium tetraborate $(Bu_4N)_2B_4O_7$ (80 ml, 20 mmol), was introduced. The temperature was not allowed to exceed 0° C.

The mixture was stirred at −1° to 1° C. for 1 hour with continued Ar protection and then poured into a large volume (1400 ml) of cold methanol (−60° C.). The resulting coagulate of polymer was separated, washed and dried as described in Example 1.

The crude polymer was redissolved in DMF (300 ml), filtered, precipitated with cold methanol, washed with large volumes of methanol and water, stirred for 4 hours with a large amount of water at room temperature and dried at 0.04 mm Hg to yield 14.43 g of the polyurethane represented generally as 3 in FIG. 2. $^1$H NMR spectral analysis of 3 (FIG. 2) showed that the polyurethane contained 0.45 mmol of acetylthio groups per gram of polyurethane and that it contained no unreacted bromobutyl groups.

The acetylthio-modified polyurethane 3 is similar to starting polyurethane 1 in both visual appearance and propensity for water absorption. A sample of polyurethane 3 was heated in vacuo at 209°–214° C., which is the highest temperature recommended by the manufacturer for the thermoprocessing of polyurethane 1. After 5 minutes, polyurethane 3 exhibited no visual changes and no spectral changes (as determined by $^1$H NMR) relative to a sample of polyurethane 3 that was not heated.

Example 3

Formation of Films Prepared from Polyurethane having Pendant Acetylthiobutyl Substituents This example demonstrates the preparation of surfaces in the form of films of the derivatized polyurethane.

Films of the polyurethane described in Example 2 were cast on a Teflon-coated surface using ca. 6% filtered solutions in freshly distilled THF (free of peroxides) in air at room temperature. The cast films were dried in a flow of air for 2–3 days, thoroughly washed with water, and then air-dried. The films exhibited an average thickness of about 0.2 mm.

Example 4

Preparation of Polyurethane having Pendant Butylthiol Substituents

This example demonstrates the deprotection of protected thiol groups to obtain a polyurethane having pendant thiol groups.

The polyurethane films of Example 3 were cut into rectangles (1.3×0.8 cm, total surface area ca. 2 cm²). The films were soaked for 1.5 h in a deoxygenated aqueous solution of hydroxylamine hydrochloride (0.6M), NaOH (0.51M), ethylenediaminetetraacetic acid (EDTA; free acid, 0.3 mg/ml), Na$_2$HPO$_4$ (52 mM) and sodium dodecyl sulfate (0.1 mg/ml) at 20°–22° C. under a blanket of Ar.

The films were removed from the hydroxylamine solution and rinsed briefly with a 2 mM solution of EDTA disodium salt.

While the invention has been described in detail and with reference to specific examples thereof, it will be apparent to one skilled in the art that various changes and modifications can be made therein without departing from the spirit and scope thereof.

What is claimed is:

1. A process for preparing the polyurethane derivative, the process comprising:

providing a polyurethane comprising a urethane amino moiety;

providing a multifunctional linker reagent of a formula:

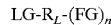

LG-R$_L$-(FG)$_n$ wherein n is an integer from 1 to 3, FG is a functional group selected from the group consisting of a halogen, a carboxyl group, a sulfonate ester, and an epoxy group, LG is a leaving group selected from the group consisting of a halogen, a carboxyl group, a sulfonate ester, and an epoxy group, and R$_L$ is an (n+1)-valent organic radical comprising at least one carbon atom;

providing a protected thiol-containing reagent of a formula R—C(O)SH, or a salt thereof, wherein R is a C$_1$ to C$_6$ alkyl group;

reacting the multifunctional linker reagent with the urethane amino moiety to form a polyurethane substituted with at least one substituent group of a formula

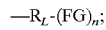

—R$_L$-(FG)$_n$;

reacting the polyurethane substituted with at least one substituent group with a protected thiol-containing reagent to form the polyurethane comprising the thiol substituent pendant from a urethane nitrogen.

2. The process of claim 1, wherein R$_L$ is a bivalent organic radical selected from the group consisting of C$_1$ to C$_{18}$ alkylene, C$_1$ to C$_{18}$ alkyleneamino, C$_1$ to C$_{18}$ alkyleneoxy, C$_1$ to C$_{18}$ haloalkylene, C$_2$ to C$_{18}$ alkenylene, C$_6$ to C$_{18}$ arylene, a modified C$_2$ to C$_{18}$ alkenylene having at least one carbon substituted by a halogen group, C$_2$ to C$_{18}$ alkenylene having one or more O, S, or N atoms incorporated into an alkenylene chain, a bivalent heterocyclic radical, and mixtures thereof.

3. The process of claim 2, wherein R$_L$ is a member selected from the group consisting of C$_1$ to C$_6$ alkylene.

4. The process of claim 2, wherein R$_L$ is butylene, FG is a bromo group, LG is a bromo group and n is 1.

5. The process of claim 1, wherein LG is a bromo group.

6. The process of claim 1, wherein the sulfonate ester is a member selected from the group consisting of mesylate, triflate, and tosylate.

7. The process of claim 1, wherein the sulfonate ester is a member selected from the group consisting of a ω-bromoalkyl mesylate, a ω-bromoalkyl triflate, and a ωbromoalkyl tosylate.

8. The process of claim 1, wherein the multifunctional linker reagent is a member selected from the group consisting of a dibromoalkyl compound, a bromo-carboxyalkyl compound, and a bromo-epoxyalkyl compound.

9. The process of claim 8, wherein the dibromoalkyl compound is a 1,ω-dibromoalkyl compound or a substituted 1,ω-dibromoalkyl compound.

10. The process of claim 9, wherein the dibromoalkyl compound is a C$_2$–C$_6$1,ω-dibromoalkyl compound.

11. The process of claim 9, wherein the dibromoalkyl compound is 1,6-dibromohexane or 1,4-dibromobutane.

12. The process of claim 8, wherein the bromo-carboxyalkyl compound is a ω-bromocarboxylic acid or a substituted ω-bromocarboxylic acid.

13. The process of claim 8, wherein the bromo-epoxyalkyl compound is epibromohydrin.

14. The process of claim 1, wherein the process is conducted in a presence of an aprotic solvent.

15. The process of claim 14, wherein the aprotic solvent is a member selected from the group consisting of N,N-dimethylacetamide, N,N-dimethyl formamide, 1-methyl-2-pyrrolidinone, tetrahydrofuran, dioxane, and dimethyl sulfoxide.

16. The process of claim 1, wherein the process is conducted in a presence of a base soluble in the aprotic solvent.

17. The process of claim 16, wherein the base is a member selected from the group consisting of sodium hydride, lithium diisopropylamide, and sodium.

18. The process of claim 16, wherein the base is potassium tert-butoxide, dimsyl sodium, lithium hydride, sodium amide, lithium N,N-dialkylamide, or lithium N,N-dicyclohexylamide.

19. The process of claim 16, wherein the base is lithium tert-butoxide.

20. The process of claim 18, wherein the multifunctional linker reagent is 1,6-dibromohexane, and the base is lithium diisopropylamide.

21. The process of claim 9, wherein the multifunctional linker reagent is 1,4-dibromobutane.

22. The process of claim 1, wherein the protected thiol-containing reagent is thiolacetic acid.

23. The process of claim 1, wherein the protected thiol-containing reagent is tetrabutylammonium thioacetate.

24. A process of preparing a polyurethane derivative, the process comprising:

providing a polyurethane;

providing a multi-functional linker, wherein the multi-functional linker has a leaving group and a functional group;

providing a protected thiol-containing reagent comprising a thiolic moiety;

contacting the polyurethane with the multi-functional linker in the presence of an aprotic solvent and a base such that the leaving group reacts with the polyurethane to form a polyurethane substituted with at least one substituent group; and contacting the polyurethane substituted with at least one substituent group with a protected thiol-containing reagent such that the functional group reacts with the thiolic moiety to form the polyurethane derivative having a thiol substituent comprising a sulfur atom connected to the polyurethane derivative and a fragment connected to the sulfur atom, wherein the thiol substituent is pending from the polyurethane derivative, provided that when the fragment is remove, the sulfur atom remains pending from the polyurethane derivative.

25. The process of claim 24, wherein the leaving group is a bromo group and the functional group is a member selected from the group consisting of halogen, a sulfonate ester, a carboxyl group, and an epoxy group.

26. The process of claim 24, wherein the multi-functional linker is represented by the formula:

$$Br-R_L-(FG)_n$$

wherein n is an integer from 1 to 3, FG is a functional group selected from the group consisting of a halogen, a carboxyl group, a sulfonate ester, and an epoxy group, and $R_L$ is an (n+1)-valent organic radical comprising at least one carbon atom.

27. The process of claim 24, wherein the thiol substituent by the formula:—$R_L$ -$(S-R^1)_n$ wherein n is an integer from 1 to 3, and $R^1$ is at least one of $C(O)R^3$ and $SR^4$, wherein $R^3$ is a $C_1$ to $C_6$ alkyl group and $R^4$ is a heterocyclic group or an electron deficient aromatic group.

* * * * *

UNITED STATES PATENT AND TRADEMARK OFFICE
CERTIFICATE OF CORRECTION

PATENT NO. : 6,900,282 B2
DATED : May 31, 2005
INVENTOR(S) : Ivan Aferiev, Ilia Fishbein and Robert J. Levy It is certified that error appears in the above-identified patent and that said Letters Patent is hereby corrected as shown below:

<u>Title page,</u>
Item [63], Related U.S. Application Data, "Jan. 21, 2000" should read
-- July 21, 2000 --.

Signed and Sealed this

Nineteenth Day of July, 2005

JON W. DUDAS
*Director of the United States Patent and Trademark Office*